United States Patent
Krass et al.

(10) Patent No.: US 7,496,508 B2
(45) Date of Patent: Feb. 24, 2009

(54) METHOD OF DETERMINING DATABASE ENTRIES

(75) Inventors: Stefanie Krass, Aachen (DE); Henrik Hodam, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1236 days.

(21) Appl. No.: 10/125,796

(22) Filed: Apr. 18, 2002

(65) Prior Publication Data

US 2002/0169751 A1 Nov. 14, 2002

(30) Foreign Application Priority Data

Apr. 20, 2001 (DE) .................. 101 19 677

(51) Int. Cl.
G10L 15/14 (2006.01)
G10L 15/22 (2006.01)

(52) U.S. Cl. .................. 704/243; 704/255; 704/256

(58) Field of Classification Search ............... 704/270, 704/270.1, 275, 277, 9, 271, 249, 244, 254, 704/235, 251, 243, 255, 256; 379/223, 88.01, 379/88.03
See application file for complete search history.

(56) References Cited

U.S. PATENT DOCUMENTS

| | | | | |
|---|---|---|---|---|
| 5,027,406 A * | 6/1991 | Roberts et al. | ............... | 704/244 |
| 5,715,369 A * | 2/1998 | Spoltman et al. | ............. | 704/270 |
| 5,765,132 A * | 6/1998 | Roberts | ............. | 704/254 |
| 5,797,116 A * | 8/1998 | Yamada et al. | ............. | 704/10 |
| 5,845,246 A * | 12/1998 | Schalk | ............. | 704/243 |
| 5,852,801 A * | 12/1998 | Hon et al. | ............. | 704/244 |
| 5,933,804 A * | 8/1999 | Huang et al. | ............. | 704/244 |
| 6,012,030 A * | 1/2000 | French-St. George et al. | ..... | 704/275 |
| 6,018,708 A * | 1/2000 | Dahan et al. | ............. | 704/244 |
| 6,073,097 A * | 6/2000 | Gould et al. | ............. | 704/251 |
| 6,122,361 A * | 9/2000 | Gupta | ............. | 379/223 |
| 6,138,100 A * | 10/2000 | Dutton et al. | ............. | 704/275 |
| 6,208,964 B1 * | 3/2001 | Sabourin | ............. | 704/244 |
| 6,363,348 B1 * | 3/2002 | Besling et al. | ............. | 704/270.1 |
| 6,601,027 B1 * | 7/2003 | Wright et al. | ............. | 704/235 |
| 6,801,893 B1 * | 10/2004 | Backfried et al. | ............. | 704/257 |
| 7,120,582 B1 * | 10/2006 | Young et al. | ............. | 704/255 |
| 2002/0188447 A1 * | 12/2002 | Coon et al. | ............. | 704/249 |

OTHER PUBLICATIONS

Wikipedia, "Hidden Markov Model", 6 Pages.*

* cited by examiner

*Primary Examiner*—Martin Lerner

(57) ABSTRACT

The invention relates to a method of determining database entries of a database (9) by means of an automatic dialog system (1) in which the following steps are provided:
1.1 temporary storage of a speech input,
1.2 processing of the speech utterance by means of an automatic speech recognition device (4) and generation of a speech recognition result using a first lexicon (6) which has a first set of lexicon entries, where a lexicon entry contains at least one acoustic reference,
1.3 search for a database entry corresponding to the speech recognition result,
1.4 for the case where no database entry is found in step 1.3, adaptation of the first lexicon (6) so that the first lexicon (6) has a second set of lexicon entries which differs from the first set of lexicon entries by at least one lexicon entry,
repetition of steps 1.2 and 1.3 using the temporarily stored speech utterance and the adapted first lexicon (6).

9 Claims, 2 Drawing Sheets

METHOD OF DETERMINING DATABASE ENTRIES

BACKGROUND OF THE INVENTION

The invention relates a method of determining database entries of a database by means of an automatic dialog system.

To guarantee automatic operation of the dialog system, usually an automatic speech recognition device is used which accesses a lexicon with lexicon entries (vocabulary of the speech recognition device) and works on the basis of Hidden Markov Models. The lexicon entries contain acoustic references for the speech recognition device which are compared with a speech input in a speech recognition procedure. The acoustic references represent for example sequences of phonemes. The method according to the invention for example relates to a "Yellow Pages" service. Using such a service each user can gain information on possible suppliers of a required sector for example doctors, tradesmen or other companies, but also public installations such as police stations, swimming pools, schools etc. Such sector information systems via telephone i.e. in the form of specialist telephone information are best known. In addition, there are already such information systems in data networks for example the internet or intranet. The terminal, depending on the type of information system, is either a phone, a mobile phone, a computer or an organizer etc. with a corresponding telephone function or, if an information system in a pure data network is used, PCs or organizers or mobile phones with the corresponding access facilities to the network concerned, for example WAP mobiles. The search parameters are various search criteria e.g. the sector, specialist field or location, or the associated search concepts of e.g. "doctors", or "homeopathy" or "Munich". The subscriber data may be, for example, the telephone number, the address or other information which enables the user to contact or reach the supplier subscribing to the information system i.e. included in the database of the information system. In known systems a lexicon is used for certain categories of speech inputs for example input of a sector, which lexicon is tailored to this demand on the speech recognition system in order to limit computing cost. Here the problem arises that the database search then performed for the speech recognition result concerned can find no associated database entry which can be output to the user.

OBJECTS AND SUMMARY OF THE INVENTION

The invention is based on the object of countering the stated problems with minimum additional computing cost, where comfort for the user should be affected the least possible.

This object is achieved by the method mentioned above having the following features:

1.1 temporary storage of speech input,
1.2 processing of the speech input by means of an automatic speech recognition system and generation of a speech recognition result using a first lexicon which has a first set of lexicon entries, where a lexicon entry contains at least one acoustic reference,
1.3 search for a database entry corresponding to the speech recognition result,
1.4 for the case where no database entry is found in step 1.3, adaptation of the first lexicon so that the first lexicon has a second set of lexicon entries which differ from the first set of lexicon entries in at least one lexicon entry,
repetition of steps 1.2 and 1.3 using the temporarily stored speech utterance and the adapted first lexicon.

Even if the first database search is unsuccessful, the user need not repeat his speech input produced by speech utterance. The temporarily stored speech input is used for a second speech recognition operation with an adapted lexicon. The lexicon is adapted dynamically. The strategy for adaptation of the lexicon can be selected so that the smallest possible lexicon guarantees the maximum probability of successful allocation of a database entry to the speech recognition result concerned. In particular a total lexicon is used, the entries of which can be used to adapt the first lexicon.

One embodiment guarantees that with poor quality speech inputs and if there are no allocatable database entries, the method according to the invention is interrupted according to a preset criterion.

Other embodiments are described herein in which the lexicon entries of the first lexicon used for speech recognition are associated with a category of database entries. In one adaptation of the lexicon, within the limits of this category of database entries (for example a sector), either additional lexicon entries are added, or lexicon entries are changed. In another embodiment for adaptation of the first lexicon, the lexicon entries are adapted outside the category. If the first lexicon before adaptation contains lexicon entries belonging to a particular category of database entries, after adaptation the first lexicon contains at least one lexicon entry belonging to a related category (e.g. a related sector).

In the embodiment variant as claimed in claim 6, for the case where no database entry can be allocated to a speech input, adaptation of the lexicon is provided not only for individual speech recognition result alternatives but speech recognition alternatives are also taken into account when the lexicon is adapted. This enhances the probability that with a renewed speech recognition operation, a database entry can now be allocated for the temporarily stored speech input.

The method according to the invention is used in particular to determine entries in a Yellow Pages data collection (claim 7) where access to the dialog system takes place in particular through a telephone interface (claim 8).

The invention also relates to an automatic dialog system used for implementing the method according to the invention.

BRIEF DESCRIPTION OF THE DRAWING OBJECTS

Examples of embodiment of the invention are described in more detail using the drawings in which.

DETAILED DESCRIPTION OF THE INVENTION

Figure 1:
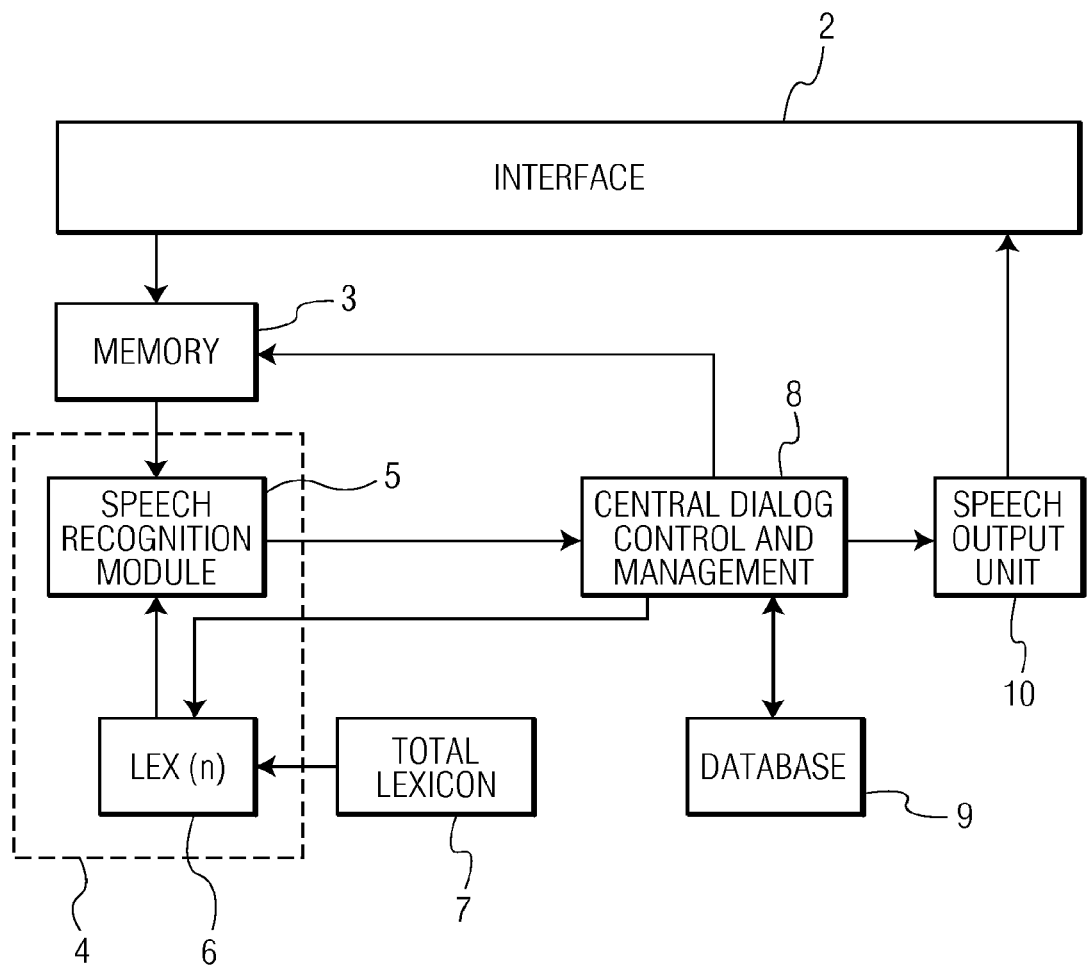
FIG. 1 shows a block circuit diagram of a dialog system.

FIG. 1 shows a dialog system 1 with an interface 2 here embodied as a telephone interface. By means of the interface 2 the dialog system 1 is coupled to a telephone network where applicable via a private branch exchange. A memory 3 is provided by means of which the received speech inputs can be temporarily stored as sound files. An automatic speech recognition device 4 serves for automatic recognition of the speech inputs stored in the memory 3. The speech recognition device 4 contains a speech recognition module 5 and a lexicon 6, the lexicon entries of which constitute the vocabulary available to the speech recognition device 4. Each lexicon entry contains at least one acoustic reference describing a word or a word component. Each acoustic references corresponds to a Hidden Markov Model (HMM) with at least one state. The speech recognition module 5 here comprises all functions of the speech recognition device 4 except for the lexicon 6. The speech recognition device 4 can for example be implemented using the system "Speech Pearl" by Philips.

In the dialog system 1 according to the invention the lexicon 6 used by the speech recognition device 4 is not set but dynamically adaptable. In the present example the lexicon entries of the lexicon 6 constitute a sub-set of a total lexicon 7. The total lexicon 7 constitutes a reservoir of lexicon entries for the lexicon 6. A central dialog control and management unit 8 serves to control a dialog with a user and also controls the adaptation of the lexicon 6. The unit 8 has access to a database 9 coupled to it with application-specific data and controls a speech output unit 10 by means of which speech outputs are generated and via the interface 2 output to the user.

The application-specific data stored in the database 9 define the dialog structures which can be preset for each application. Thus for example a dialog with a user can begin with a greeting and a subsequent request for activation of a particular speech input. A subsequent speech input by the user is received via the interface 2 and temporarily stored in the memory 3. The temporarily stored speech input 3 is converted by means of the automatic speech recognition device 4 into a speech recognition result which is supplied to the unit 8 which then, as a function of the speech recognition result, either continues the dialog with the user in the prespecified manner according to the data stored in the database 9, or ends the dialog.

Figure 2:
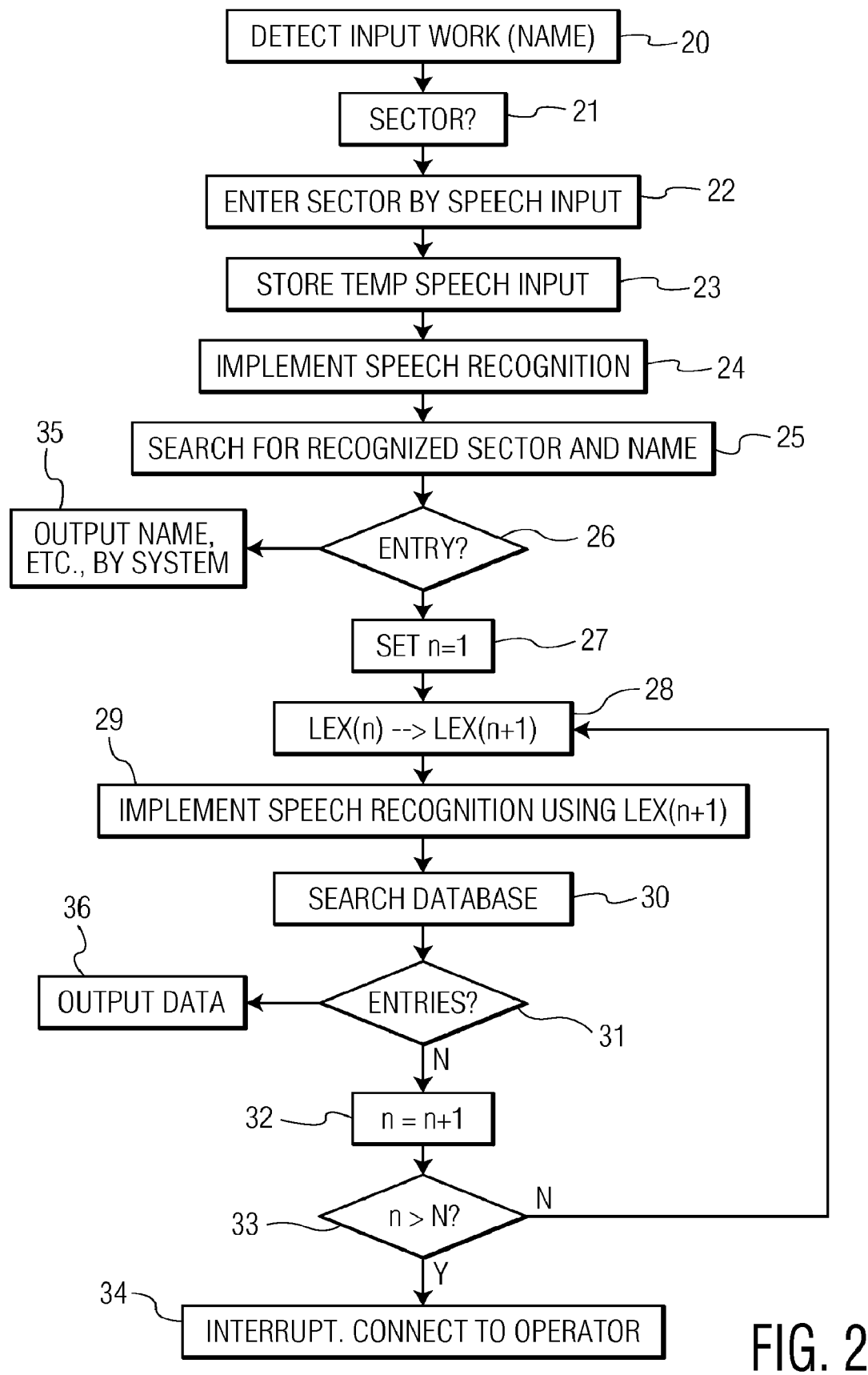
FIG. 2 shows a flow chart to explain the method according to the invention.

FIG. 2 shows a flow chart for further explanation of the invention. The invention will here be described using the example of access to a Yellow Pages data collection in which the user can retrieve sector information. The sector information is stored here in the database 9 and contains for example for a multiplicity of company names a respective location, the associated sector, a street name, a telephone number and a postal code. After access to the dialog system 1 by a user by activation of a telephone call, the dialog system 1 outputs a greeting formula to the user and asks for the input of a name of a town. After input of a name pf a town which is correctly detected in step 20, the user is asked in step 21 to enter a sector. After entering a sector by means of speech input in step 22, this speech input is temporarily stored as a sound file in memory 3 in step 23. Then in step 24 a speech recognition procedure is performed for the temporarily stored speech input using speech recognition device 4. A lexicon LEX (1) is used for this, which represents a restricted number of sector names i.e. the vocabulary used by the speech recognition device is restricted accordingly in this step 24. With the speech recognition result generated in step 24, a database search in the database 9 is performed in the subsequent step 25 by means of a dialog control and management unit 8 in an attempt to find company names stored in the database 9 for the recognized sector name and town. If it is found in step 26 that at least one database entry is found belonging to the recognized branch name, either the corresponding company name and where applicable further associated company information is output to the user via speech output in step 35, or the dialog with the user is continued with a speech output by which the user is asked to specify the information required more precisely (this could for example be done by entering a post code or road name). If, however, it is found in step 26 that there are no database entries in database 9 that correspond to the recognized town and sector name, a parameter n, which serves to indicate the version of lexicon 6 used in the previous speech recognition procedure, is set to n=1 in step 27. In step 28 the lexicon 6 is then adapted where the lexicon version LEX(n) transforms into lexicon version LEX(n+1), which differs from lexicon version LEX(n) in at least one lexicon entry. Compared to lexicon version LEX(n+1) the lexicon version LEX (n) contains a restricted number of lexicon entries representing sector names, while also sector names less frequently sought are considered as n increases. The expansion of the lexicon is determined by the allocation tables stored in the database 9.

If the available lexicon entries of the total lexicon 7 are divided into categories, the lexicon can be adapted either within categories and/or between categories. An example for a particular category of lexicon entries is for example the number of sector names for a particular town. A lexicon adaptation within the category would exist if other and/or extra sector names allocated to this town were considered for the formation of the lexicon 6. In an adaptation of the lexicon between categories, in this example an adaptation of the lexicon, also sector names allocated to other towns could be taken into account, for example for towns lying in the vicinity of the recognized town. In this case too the allocations are defined in allocation tables stored in database 9. In principle a multiplicity of categories are possible which arise from the relevant application and requests for adaptation of the lexicon and are optimized for this purpose.

After adaptation of the lexicon in step 28, a speech recognition method is performed in step 29a in which the modified lexicon LEX (n+1) is used. With the speech recognition result determined, which represents a known sector, and with the town already known, a further database search is performed in database 9 by the dialog control and management unit 8. If it is found in step 31 that the database search supplies entries (sector names) for the recognized town, the method is continued with step 36 which contains measures for output of data as in step 35.

If it is found in step 31 that again no database entry can be allocated, the parameter n is incremented by unity in step 32. In step 33 it is checked whether an interrupt criterion is fulfilled. In the present case the interrupt criterion is represented by the figure N which is set a priori. The figure N represents the number of required adaptations of the lexicon. If the interrupt criterion is not yet fulfilled in step 33 (n≦N), the system returns to step 28. If it is found in step 33 that the interrupt criterion is fulfilled i.e. n>N, the processing of the user input by the dialog system 1 is interrupted. In the present case the dialog between the dialog system 1 and the user is interrupted and also in step 34 the user is connected to a telephone operator in order to make the desired data available to the user in this manner.

In an embodiment of the invention the speech recognition device 1 supplies not only an individual speech recognition result, but a number N of best recognition result alternatives with N≧1. In this case the adaptation of lexicon 6 depends on one or more of the recognition result alternatives supplied by the speech recognition device 4. Thus the speech recognition device 6 can output as a recognition result for example, after input of a sector name, two similarly sounding sector names where the two speech recognition result alternatives are then ordered according to their reliability. If in the database 9, in the allocation table stored there, different allocations for adaptation of lexicon 6 are provided for the two sector names determined as speech recognition result alternatives, these are also taken into account in the adaptation of lexicon 6.

The invention claimed is:

1. A method of determining database entries of a database using an automatic dialog system, the method comprising:
   temporarily storing speech input, processing speech input using an automatic speech recognition device and generating a speech recognition result using a first lexicon, wherein the first lexicon comprises a first set of lexicon entries, and each lexicon entry contains at least one acoustic reference, which corresponds to a Hidden Markov Model, searching the database for a database entry corresponding to the speech recognition result, after the searching, and in a case where no database entry is found, adapting the first lexicon to include a second set of lexicon entries without additional user input, wherein the second set of lexicon entries differs from the first set of lexicon entries by at least one lexicon entry, and repeating the processing and the searching using the temporarily stored speech input and the adapted first lexicon; and wherein, in a case where a database entry is found, outputting.

2. The method as claimed in claim 1, wherein the first lexicon entries are taken from a second lexicon which serves as an overall lexicon.

3. The method as claimed in claim 1, wherein the processing, the searching and the adapting are repeated until an interrupt criterion is fulfilled.

4. The method as claimed in claim 1, wherein the step of adapting includes providing categories of lexicon entries, corresponding to categories of database entries, and wherein the adaptation of the first lexicon with respect to a category of lexicon entries deviates from the first lexicon in at least one lexicon entry.

5. The method as claimed in claim 1, wherein categories of lexicon entries are provided that correspond to categories of database entries, and wherein a second category of lexicon entries is allocated, which includes at least a subset of entries of the first lexicon adaptation, said second category comprising at least a subset of a category of lexicon entries corresponding to the first lexicon.

6. The method as claimed in claim 1, wherein a speech recognition result is supplied by a speech recognition device, said result comprising a number N of best recognition result alternatives if N>1, and wherein the adaptation of the lexicon depends on at least one recognition result alternative.

7. The method as claimed in claim 1, wherein the database entries are parts of a Yellow Pages data collection.

8. The method as claimed in claim 1, wherein the dialog system has a telephone interface by which speech inputs and speech outputs arc transmitted.

9. An automatic dialog system for determining database entries of a database, said system including a plurality of system components for carrying out the following steps:

temporarily storing of a speech utterance to be input, processing of the speech utterance using an automatic speech recognition device and generating a speech recognition result using a first lexicon, said first lexicon including a first set of lexicon entries, and wherein each lexicon entry comprises at least one acoustic reference, which corresponds to a Hidden Markov Model, searching for a database entry corresponding to the speech recognition result, after the searching, and, in a case where no database entry is found, adapting the first lexicon to include a second set of lexicon entries without additional user input, wherein the second set of lexicon entries differs from the first set of lexicon entries by at least one lexicon entry, and repeating the processing and the searching using the temporarily stored speech utterance and the adapted first lexicon; and wherein, in a case where the database entry is found, outputting.

* * * * *